2,819,651

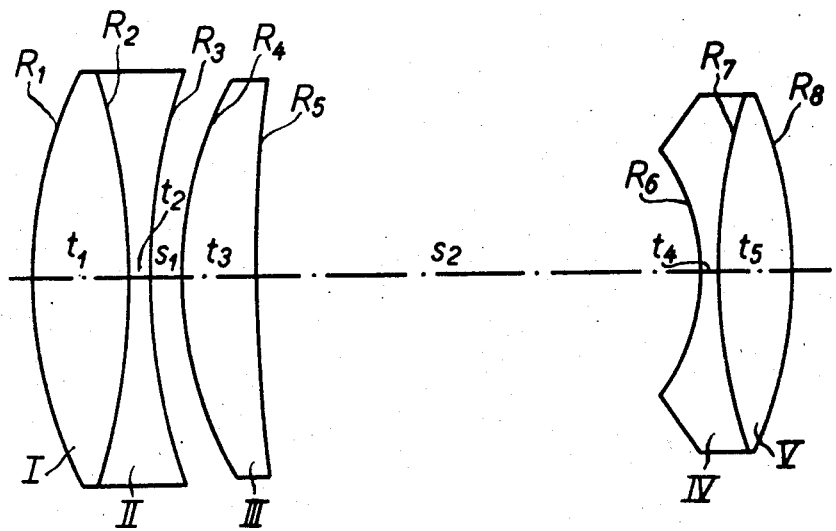

Patented Jan. 14, 1958

2,819,651

TELEPHOTO OBJECTIVE

Carl Baur, Baldham, and Christian Otzen, Munich, Germany, assignors to Firma Agfa Camera-Werk Aktiengesellschaft, Munich, Germany Application December 20, 1955, Serial No. 554,342

Claims priority, application Germany February 23, 1955

11 Claims. (Cl. 88—57)

The present invention relates to teleobjectives, and more particularly to a telephoto objective comprising a positive meniscus doublet in front, a negative meniscus doublet in the rear, and a positive single meniscus arranged between the positive front member and the negative rear member and closely behind the positive front member.

In known similar telephoto objectives of this type in which, however, the single positive member is located in front of the positive meniscus doublet, a relative aperture of 1:4.5 or smaller is obtained, and the angle of field is up to about 20°. Moreover, the known telephoto objectives according to the prior art have a relatively high distortion of 4% or more.

It is the object of the present invention to improve the known teleobjectives of this type, and to provide a teleobjective having a useful angle of field of about 30° and a relative aperture of 1:4, or 1:3.5.

It is another object of the present invention to reduce the distortion of a teleobjective of the above-defined type, for instance to a value of less than 1% for an angle of field of 20°, although the negative member consists of only two lenses.

It is a further object of the present invention to eliminate to a great extent errors in definition in a teleobjective of the above-defined type.

It is still a further object of the present invention to provide a teleobjective in which the spherical aberration for two different wave lengths of the spectrum is completely corrected while at the same time lateral color aberration is eliminated.

With these objects in view, the present invention mainly consists in a teleobjective comprising a positive front member having a focal length greater than eight times the focal length of the objective, a negative rear member axially spaced from the positive front member, and a positive middle member arranged between the positive front member and the negative rear member and having a focal length which is greater than 0.5 times and less than 0.7 times the focal length of the objective as a whole.

The figure of the drawing illustrates a preferred embodiment of the present invention in which the positive front member is a cemented meniscus doublet, the negative rear member is a cemented meniscus doublet having outer air surfaces concave to the front and having a cemented collective contact surface concave to the rear, and the positive middle member is a positive meniscus singlet arranged closely behind the positive front member.

By this arrangement, a useful angle of field of a teleobjective of about 30° at a relative aperture of 1:4 to 1:3.5 and a substantial reduction of a distortion, for instance to a value smaller than 1% for an angle of field of 20°, can be obtained although the negative member consists of only two lenses of which one is negative and the other is positive. All errors in definition can be eliminated to a great extent, if according to the present invention the single uncemented positive meniscus is arranged directly behind the cemented meniscus doublet which constitutes the front member, if the negative meniscus doublet in the rear has air surfaces concave to the front and to the object and a collective cemented contact surface concave to the rear and to the image, and if the focal length of the cemented positive meniscus is greater than eight times the focal length of the objective as a whole, and if the focal length of the positive meniscus singlet is greater than 0.5 times and smaller than 0.7 times the focal length of the objective as a whole.

Preferably, the air space between the positive meniscus singlet and the negative rear member is a distance smaller than 34% and greater than 27.5% of the focal length of the objective. In accordance with the present invention, it is particularly advantageous to design the lenses in such a manner that the absolute sum of the radii of the outer air surfaces of the negative rear member is greater than the radius of the contact surface of the same and not more than the radius of the contact surface plus 20% of the focal length of the objective as a whole which may be mathematically expressed as follows:

$$R_7 \leq R_6 + R_8 \leq R_7 + 0.2\ F$$

Particularly, by the provision of a single uncemented positive meniscus behind the cemented meniscus doublet which constitutes the positive front member, the spherical aberration for two different wave lengths of the spectrum can be eliminated by fulfillment of the Gauss condition, while simultaneously lateral color aberration is completely elminated.

The novel features which are considered as characteristic for the invention are set forth in particular in the appended claims. The invention itself and its objects and advantages will be best understood from the following description of a specific embodiment when read in connection with the accompanying drawing which is a side view of a telephoto objective according to the present invention.

The positive front member is a positive meniscus doublet composed of a positive lens I and a negative lens II which are cemented together along an interface. Lens I has an outer surface having the radius $R_1$ and a cemented contact surface having the radius $R_2$. Lens II has an outer surface having the radius $R_3$ and a cemented contact surface having the radius $R_2$. The lenses I and II have thicknesses $t_1$ and $t_2$, respectively.

A positive meniscus singlet III is arranged directly behind the positive front member I, II and is spaced from the same an air space $s_1$. The single positive lens III is bounded by outer surfaces having a radii $R_4$ and $R_5$, respectively, and has a thickness $t_3$.

The negative rear member is a negative meniscus doublet composed of a negative lens IV and a positive lens V cemented together along an interface. The negative rear member IV, V is spaced from the middle member III an air space $s_2$. Lens IV is bounded by an outer concave air surface having a radius of curvature $R_6$ and by a cemented contact surface having a radius $R_7$. Lens V is bounded by an outer air surface having the radius $R_8$ and by a cemented contact surface having the radius $R_7$. The lenses IV, V have thickness $t_4$ and $t_5$, respectively.

The negative meniscus composed of lenses IV and V is bounded by outer air surface having the radii $R_6$ and $R_8$, respectively, which are concave to the front and to the object. The interface having the radius $R_7$ is collective and concave to the rear and to the image.

Due to the spherical correction, which includes the chromatic correction, the circle of confusion in the focusing plane has a diameter of 0.01% of the focal length of the objective in an example for $F=1.0$ and a relative aperture of 1:4. A graph of the coma shows within the angle of field a complete coincidence for the wave lengths of the lines of spectrum D of helium, 587.6 m$\mu$, and G of mercury, 435.8 m$\mu$ so that lateral color aberration is fully corrected. Astigmatism, curvature of the image field, and distortion are reduced to small values due to the construction of the negative rear member as a doublet whose air surfaces ($R_6$ and $R_8$) are concave to the front and to the object, and whose cemented interface ($R_7$) is collective and concave to the rear and to the image. This is due to the fact that both image shells are closely spaced and moreover located almost exactly in the focusing plane.

A remarkable result of the present invention is that even at an angle of field of 25°, a marginal brightness of almost 50% is obtained. A further advantage of the teleobjective according to the present invention resides in that the height of passage of the last lens surface on the side of the image is smaller than 11% of the focal length of the objective as a whole. Thereby, screening of the rays by the mounting means of the objective is prevented and loss of marginal brightness is avoided.

The table of data for the objective illustrated in the drawing is as follows:

Corrected angle of field 30°
$f/4$ $F=1.000$
Back focal length 37.2% of focal length of the objective

| Lens | Radii | Thicknesses | $n_D$ | V |
|---|---|---|---|---|
| I | $R_1=+0.29731$ | $t_1=0.06438$ | 1.51633 | 64.0 |
|   | $R_2=-0.44456$ | | | |
| II | $R_3=+0.40284$ | $t_2=0.01270$ | 1.62606 | 39.1 |
|    |                | $s_1=0.02105$ | | |
| III | $R_4=+0.25966$ | $t_3=0.04824$ | 1.57041 | 48.1 |
|     | $R_5=+0.95588$ | $s_2=0.29529$ | | |
| IV | $R_6=-0.13344$ | $t_4=0.01247$ | 1.51454 | 54.7 |
|    | $R_7=+0.35220$ | | | |
| V  |                | $t_5=0.04991$ | 1.60729 | 49.2 |
|    | $R_8=-0.28966$ | | | |

In the above table, lens elements are numbered in order from front to rear in the first column, the radii of curvature R are given in the second column, the thicknesses $t$ of the lens elements and the spaces $s$ between the lens elements are given in the third column, each numbered by sub-scripts from front to rear. The fourth and fifth columns contain the respective refractive indices $n_D$ for the D line of the spectrum and the Abbe numbers V, respectively. The plus and minus values of R denote surfaces respectively convex and concave to the front.

In the objective according to the above examples, the focal length of the positive front member I, II, whose surfaces have the radii $R_1$, $R_2$ and $R_3$, is 11.5 times the focal length of the objective as a whole. The focal length of the single positive meniscus III, whose surfaces have the radii $R_4$ and $R_5$, is 0.6 times the focal length of the objective as a whole.

It will be understood that each of the elements described above, or two or more together, may also find a useful application in other types of teleobjectives differing from the types described above.

While the invention has been illustrated and described as embodied in a telephoto objective having a positive front meniscus doublet, a positive single middle member and a negative rear meniscus doublet, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A teleobjective comprising a positive front member; a negative rear member axially spaced from said positive front member; and a positive middle member arranged between said positive front member and said negative rear member closely adjacent said positive front member, the focal length of said middle member being greater than 0.5 times and less than 0.7 times the focal length of the objective as a whole, the air space between said positive middle member and said negative rear member being a distance smaller than 34% and greater than 27.5% of the focal length of the objective as a whole, the focal length of said positive front member being greater than eight times the focal length of the objective as a whole.

2. A teleobjective comprising a positive front member; a negative rear member axially spaced from said positive front member and being a meniscus doublet having outer surfaces concave to the front and having a collective interface concave to the rear; and a single positive middle member arranged between said positive front member and said negative rear member closely adjacent said positive front member, the focal length of said middle member being greater than 0.5 times and less than 0.7 times the focal length of the objective as a whole, the air space between said positive middle member and said negative rear member being a distance smaller than 34% and greater than 27.5% of the focal length of the objective as a whole, the absolute sum of the radii of said outer surfaces of said negative rear member being greater than the radius of said interface and not more than the radius of said interface plus 20% of the focal length of the objective as a whole, the focal length of said positive front member being greater than eight times the focal length of the objective as a whole.

3. A telephoto objective comprising a positive front member being a cemented meniscus doublet; a negative rear member axially spaced a substantial air space from said positive front member and being a cemented meniscus doublet having outer air surfaces concave to the front and having a cemented collective contact surface concave to the rear; and a positive meniscus singlet arranged between said positive front member and said negative rear member closely behind said positive front member, the focal length of said positive meniscus singlet being greater than 0.5 times and less than 0.7 times the focal length of the objective as a whole, the focal length of said positive front member being gerater than eight times the focal length of the objective as a whole.

4. A telephoto objective comprising a positive front member being a cemented meniscus doublet; a negative rear member axially spaced a substantial air space from said positive front member and being a cemented meniscus doublet having outer air surfaces concave to the front and having a cemented collective contact surface concave to the rear; and a positive meniscus singlet arranged between said positive front member and said negative rear member closely behind said positive front member, the focal length of said positive meniscus singlet being greater than 0.5 times and less than 0.7 times the focal length of the objective as a whole, the air space between said positive meniscus singlet and said negative rear member being a distance smaller than 34% and greater than 27.5% of the focal length of the objective as a whole, the focal length of said positive front member being greater than eight times the focal length of the objective as a whole.

5. A telephoto objective comprising a positive front member being a cemented meniscus doublet; a negative rear member axially spaced a substantial air space from said positive front member and being a cemented meniscus doublet having outer air surfaces concave to the front and having a cemented collective contact surface concave to the rear; and a positive meniscus singlet arranged between said positive front member and said negative rear member closely behind said positive front member, the focal length of said positive meniscus singlet being greater than 0.5 times and less than 0.7 times the focal length of the objective as a whole, the absolute sum of the radii of said outer air surfaces of said negative rear member being greater than the radius of said cemented contact surface of the same and not more than the radius of said cemented contact surface plus 20% of the focal length of the objective as a whole, the focal length of said positive front member being greater than eight times the focal length of the objective as a whole.

6. A telephoto objective comprising a positive front member being a cemented meniscus doublet; a negative rear member axially spaced a substantial air space from said positive front member and being a cemented meniscus doublet having outer air surfaces concave to the front and having a cemented collective contact surface concave to the rear; and a positive meniscus singlet arranged between said positive front member and said negative rear member closely behind said positive front member, the focal length of said positive meniscus singlet being greater than 0.5 times and less than 0.7 times the focal length of the objective as a whole, the air space between said positive meniscus singlet and said negative rear member being a distance smaller than 34% and greater than 27.5% of the focal length of the objective as a whole, the absolute sum of the radii of said outer air surfaces of said negative rear member being greater than the radius of said cemented contact surface of the same and not more than the radius of said cemented contact surface plus 20% of the focal length of the objective as a whole, the focal length of said positive front member being greater than eight times the focal length of the objective as a whole.

7. A telephoto objective comprising a positive front member being a cemented meniscus doublet; a negative rear member axially spaced a substantial air space from said positive front member and being a cemented meniscus doublet consisting of a biconvex rear element and a biconcave front element cemented to each other, said negative rear member having outer air surfaces concave to the front and having a cemented collective contact surface concave to the rear; and a positive meniscus singlet arranged between said positive front member and said negative rear member closely behind said positive front member, the focal length of said positive front member being 11.5 times the focal length of the objective as a whole, and the focal length of said positive meniscus singlet being 0.6 times the focal length of the objective as a whole.

8. A telephoto objective constructed substantially according to the specifications in the following table:

| Lens | Radii | Thicknesses | $n_D$ | V |
|---|---|---|---|---|
| I | $R_1=+0.3\ F$ | $t_1=0.06\ F$ | 1.52 | 64 |
|   | $R_2=-0.4\ F$ | $t_2=0.01\ F$ | 1.62 | 39 |
| II | $R_3=+0.4\ F$ | $s_1=0.02\ F$ | | |
|   | $R_4=+0.3\ F$ | $t_3=0.05\ F$ | 1.57 | 48 |
| III | $R_5=+0.9\ F$ | $s_2=0.30\ F$ | | |
|   | $R_6=-0.1\ F$ | $t_4=0.01\ F$ | 1.51 | 55 |
| IV | $R_7=+0.4\ F$ | $t_5=0.05\ F$ | 1.61 | 49 |
| V | $R_8=-0.3\ F$ | | | | wherein the first column lists the lens elements in Roman numerals in order from front to rear; and where F is the focal length of the objective, $n_D$ is the index of refraction for the D line of the spectrum, V is the dispersive index; R, t, and s refer respectively to the radii of curvature of the refractive surfaces, the axial thicknesses of the elements and the air spaces between the elements, the subscripts on the characters R, t and s referring to the surfaces, the elements and the spaces being numbered consecutively from the front, the plus and minus signs in the second column corresponding to surfaces which are respectively convex and concave to the front.

9. A telephoto objective comprising a positive cemented meniscus doublet in front; a negative cemented meniscus doublet in the rear axially spaced a substantial air space from said positive meniscus doublet, said negative meniscus doublet consisting of a biconvex rear element and a biconcave front element cemented to each other and having outer air surfaces concave to the front and a cemented collective contact surface concave to the rear; and a positive meniscus singlet arranged between said positive meniscus doublet and said negative meniscus doublet and closely spaced from said positive meniscus doublet and having a focal length which is greater than 0.5 times and less than 0.7 times the focal length of the objective as a whole, the focal length of said positive front member being greater than 8 times the focal length of the objective as a whole.

10. A telephoto objective comprising a positive cemented meniscus doublet in front; a negative cemented meniscus doublet in the rear axially spaced a substantial air space from said positive meniscus doublet, said negative meniscus doublet consisting of a biconvex rear element and a biconcave front element cemented to each other and having outer air surfaces concave to the front and a cemented collective contact surface concave to the rear; and a positive meniscus singlet arranged between said positive meniscus doublet and said negative meniscus doublet and closely spaced from said positive meniscus doublet and having a focal length which is greater than 0.5 times and less than 0.7 times the focal length of the objective as a whole, the absolute sum of the radii of said outer air faces of said negative meniscus doublet being greater than the radius of said cemented contact surface of the same and not more than the radius of said cemented contact surface plus 20% of the focal length of the objective as a whole, the local length of said positive front member being greater than 8 times the focal length of the objective as a whole.

11. A telephoto objective comprising a positive cemented meniscus doublet in front; a negative cemented meniscus doublet in the rear axially spaced a substantial air space from said positive meniscus doublet, said negative meniscus doublet consisting of a biconvex rear element and a biconcave front element cemented to each other and having outer air surfaces concave to the front and a cemented collective contact surface concave to the rear; and a positive meniscus singlet arranged between said positive meniscus doublet and said negative meniscus doublet and closely spaced from said positive meniscus doublet and having a focal length which is greater than 0.5 times and less than 0.7 times the focal length of the objective as a whole, the air space between said positive meniscus singlet and said negative meniscus doublet being a distance smaller than 34% and greater than 27% of the focal length of the objective as a whole, the absolute sum of the radii of said outer air faces of said negative meniscus doublet being greater than the radius of said cemented contact surface of the same and not more than the radius of said cemented contact surface plus 20% of the focal length of the objective as a whole, the focal length of said positive front member being greater than 8 times the focal length of the objective as a whole.

References Cited in the file of this patent

UNITED STATES PATENTS

| | | |
|---|---|---|
| 2,321,973 | Bennett | June 15, 1943 |

FOREIGN PATENTS

| | | |
|---|---|---|
| 316,246 | Germany | Nov. 24, 1919 |
| 318,178 | Germany | Jan. 15, 1920 |
| 398,431 | Germany | July 14, 1924 |
| 222,709 | Great Britain | Oct. 9, 1924 |
| 861,161 | Germany | Dec. 29, 1952 |